(12) United States Patent
Aggarwal et al.

(10) Patent No.: US 7,970,772 B2
(45) Date of Patent: Jun. 28, 2011

(54) METHODS AND APPARATUS FOR DATA STREAM CLUSTERING FOR ABNORMALITY MONITORING

(75) Inventors: Charu C. Aggarwal, Ossining, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 11/753,232

(22) Filed: May 24, 2007

(65) Prior Publication Data

US 2007/0226212 A1 Sep. 27, 2007

Related U.S. Application Data

(63) Continuation of application No. 10/801,420, filed on Mar. 16, 2004, now abandoned.

(51) Int. Cl.
*G06F 7/00* (2006.01)
*G06F 17/30* (2006.01)
*G06F 15/16* (2006.01)

(52) U.S. Cl. .......... 707/748; 707/737; 707/952; 709/224
(58) Field of Classification Search .................. 707/737, 707/952, 748; 709/224
See application file for complete search history.

(56) References Cited

U.S. PATENT DOCUMENTS

| | | | |
|---|---|---|---|
| 6,460,036 B1 * | 10/2002 | Herz | 707/748 |
| 6,625,585 B1 * | 9/2003 | MacCuish et al. | 706/10 |
| 6,947,933 B2 * | 9/2005 | Smolsky | 707/6 |
| 2002/0107858 A1 * | 8/2002 | Lundahl et al. | 707/100 |
| 2002/0161763 A1 * | 10/2002 | Ye et al. | 707/7 |
| 2004/0098617 A1 * | 5/2004 | Sekar | 709/224 |

OTHER PUBLICATIONS

Charu C. Aggarwal and Philip S. Yu. A Framework for Clustering Massive Text and Categorical Data Streams. Proceedings of SIAM Conference on Data Mining, Bethesda, Maryland, Apr. 20-22, 2006, pp. 479-483.*
C.C. Aggarwal, "A Framework for Diagnosing Changes in Evolving Data Streams," ACM SIGMOD Conference, pp. 575-586, Jun. 2003.
B. Babcock et al., "Models and Issues in Data Stream Systems," ACM PODS Conference, pp. 1-30, 2002.
P. Domingos et al., "Mining High-Speed Data Streams," ACM SIGKDD Conference, 10 pages, 1998.
S. Guha et al., "ROCK: A Robust Clustering Algorithm for Categorical Attributes," Proceedings of the International Conference on Data Engineering, 10 pages, Mar. 1999.
L. O'Callaghan et al., "Streaming-Data Algorithms for High-Quality Clustering," ICDE Conference, pp. 1-25, Oct. 2001.
P.S. Bradley et al., "Scaling Clustering Algorithms to Large Databases," SIGKDD Conference, 7 pages, 1998.
S. Guha et al., "CURE: An Efficient Clustering Algorithm for Large Databases," ACM SIGMOD Conference, pp. 73-84, 1998.

(Continued)

*Primary Examiner* — Greta L Robinson
*Assistant Examiner* — Brian E Weinrich
(74) *Attorney, Agent, or Firm* — William Stock; Ryan, Mason & Lewis, LLP

(57) ABSTRACT

Techniques for monitoring abnormalities in a data stream are provided. A plurality of objects are received from the data stream and one or more clusters are created from these objects. At least a portion of the one or more clusters have statistical data of the respective cluster. It is determined from the statistical data whether one or more abnormalities exist in the data stream.

26 Claims, 4 Drawing Sheets

OTHER PUBLICATIONS

R.T. Ng et al., "Efficient and Effective Clustering Methods for Spatial Data Mining," Proceedings of the 20th VLDB Conference, pp. 144-155, 1994.

E. Knorr et al., "Algorithms for Mining Distance-Based Outliers in Large Datasets," Proceedings of the 24th VLDB Conference, 12 pages, 1998.

E. Knorr et al., "Finding Intensional Knowledge of Distance-Based Outliers," Proceedings of the 25th VLDB Conference, pp. 211-222, 1999.

S. Ramaswamy et al., "Efficient Algorithms for Mining Outliers from Large Data Sets," Proceedings of the ACM SIGMOD Conference, 12 pages, 2000.

T. Zhang et al., "BIRCH: An Efficient Data Clustering Method for Very Large Databases," ACM SIGMOD Conference, pp. 103-104, 1996.

V. Ganti et al., "CACTUS-Clustering Categorical Data Using Summaries," Proceedings of the ACM SIGKDD Conference, 11 pages, 1999.

D. Gibson et al., "Clustering Categorical Data: An Approach Based on Dynamical Systems," Proceedings of the VLDB Conference pp. 1-22, 1998.

C.C. Aggarwal et al., "A Framework for Clustering Evolving Data Streams," Proceedings of the 29th VLDB Conference, 12 pages, 2003.

* cited by examiner

METHODS AND APPARATUS FOR DATA STREAM CLUSTERING FOR ABNORMALITY MONITORING

CROSS-REFERENCE TO RELATED APPLICATION(S)

This application is a continuation of U.S. application Ser. No. 10/801,420, filed on Mar. 16, 2004 now abandoned, the disclosure of which is incorporated by reference herein.

FIELD OF THE INVENTION

The present invention is related to techniques for clustering a data stream and, more particularly, techniques for monitoring data abnormalities in the stream through the clustering of the data stream.

BACKGROUND OF THE INVENTION

In general, large volumes of continuously evolving data, which may be stored, is referred to as a data stream. Data streams have received increased attention in recent years due to technological innovations, which have facilitated the creation, maintenance and storage of such data. A number of data mining studies have been conducted in the data stream context in recent years, see, e.g., C. C. Aggarwal, "A Framework for Diagnosing Changes in Evolving Data Streams," ACM SIGMOD Conference, 2003; B. Babcock et al., "Models and Issues in Data Stream Systems," ACM PODS Conference, 2002; P. Domingos et al., "Mining High-Speed Data Streams," ACM SIGKDD Conference, 1998; S. Guha et al., "ROCK: A Robust Clustering Algorithm for Categorical Attributes," Proceedings of the International Conference on Data Engineering, 1999; and L. O'Callaghan et al., "Streaming-Data Algorithms for High-Quality Clustering," ICDE Conference, 2002.

Clustering is the partitioning of a given set of objects, such as data points, into one or more groups (clusters) of similar objects. The similarity of a data point with another data point is typically defined by a distance measure or objective function. In addition, data points that do not naturally fit into any particular cluster are referred to as outliers. Clustering has been widely studied by those in the database and data mining communities because of its applicability to a wide range of problems, see, e.g., P. Bradley et al., "Scaling Clustering Algorithms to Large Databases," SIGKDD Conference, 1998; S. Guha et al., "CURE: An Efficient Clustering Algorithm for Large Databases," ACM SIGMOD Conference, 1998; R. Ng et al., "Efficient and Effective Clustering Methods for Spatial Data Mining," Very Large Data Bases Conference, 1994; A. Jain et al., "Algorithms for Clustering Data," Prentice Hall, New Jersey, 1998; L. Kaufman et al., "Finding Groups in Data—An Introduction to Cluster Analysis," Wiley Series in Probability and Math Sciences, 1990; E. Knorr et al., "Algorithms for Mining Distance-Based Outliers in Large Data Sets," Proceedings of the VLDB Conference, September, 1998; E. Knorr et al., "Finding Intensional Knowledge of Distance-Based Outliers," Proceedings of the VLDB Conference, September, 1999; S. Ramaswamy et al., "Efficient Algorithms for Mining Outliers from Large Data Sets," Proceedings of the ACM SIGMOD Conference, 2000; and T. Zhang et al., "BIRCH: An Efficient Data Clustering Method for Very Large Databases," ACM SIGMOD Conference, 1996.

The problem of categorical data clustering has also been recently studied, see, e.g., V. Ganti et al., "CACTUS—Clustering Categorical Data Using Summaries," Proceedings of the ACM SIGKDD Conference, 1999; D. Gibson et al., "Clustering Categorical Data: An Approach Based on Dynamical Systems," Proceedings of the VLDB Conference, 1998; and S. Guha et al., "ROCK: A Robust Clustering Algorithm for Categorical Attributes," Proceedings of the International Conference on Data Engineering, 1999. However, these techniques cannot be utilized for clustering data streams, since they do not naturally scale well with increasing data size. Furthermore, a data stream clustering technique requires the appropriate mechanisms to deal with the temporal issues created by the evolution of the data stream.

Clustering and outlier monitoring present a number of unique challenges in an evolving data stream environment. For example, the continuous evolution of clusters makes it essential to quickly identify new patterns in the data. In addition, it is also important to provide end users with the ability to analyze the clusters in an offline fashion.

In the data stream environment, outlier and abnormality monitoring is especially problematic, since the temporal component of the data stream influences whether an outlier is defined as an abnormality. For example, the first arriving data point of a cluster may be considered an outlier at the moment of its arrival. However, as time passes, data points may join the newly created cluster, thereby initiating a new pattern of activity resulting from the evolution of the data stream. On the other hand, in many other cases, data points may not join the outlier or newly created cluster over time, thereby defining an abnormality. An important aspect of the data stream clustering process is the ability to identify and label such events effectively.

SUMMARY OF THE INVENTION

The present invention provides techniques for clustering a data stream and, more particularly, techniques for monitoring data abnormalities in the stream through the clustering of the data stream.

For example, in one aspect of the invention, a technique for monitoring abnormalities in a data stream comprises the following steps. A plurality of objects are received from the data stream, and one or more clusters are created from the plurality of objects. At least a portion of the one or more clusters have statistical data of the respective cluster. It is determined from the statistical data whether one or more abnormalities exist in the data stream.

Thus, a framework may be provided in which select statistical data may be stored at regular intervals. This results in a technique which is able to analyze different characteristics of the clusters in an effective manner. Advantageously, the inventive techniques may be useful for clustering different kinds of categorical data sets, and adapting to the rapidly evolving nature of a data stream.

Additional advantages of the inventive techniques of the present invention include the ability to explore the clusters in an online fashion, and store statistical data which may be utilized for a better understanding and analysis of the data stream. In applications in which the data stream evolves considerably, different kinds of clusters may assist in understanding the behavior of the data stream over different periods in time. This is advantageous since a fast data stream cannot be repeatedly processed in order to resolve different kinds of queries.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular system architecture. The invention is instead more generally applicable to any data processing system in which it is desirable to perform efficient and effective data stream clustering. It is to be understood that the phrase "data point," illustratively used herein, is one example of a data "object."

As will be illustrated in detail below, the present invention introduces techniques for clustering a data stream and, more particularly, techniques for monitoring data abnormalities in the stream through the clustering of the data stream. An abnormality, as referred to herein, is defined as an outlier cluster or outlier data point of the data stream having specifically defined values in the stored statistical data of the data point or cluster. The stored statistical data may include, for example, the number of pairwise attribute values, the number of categorical attribute values, the number of data points, the sum of the weights of the data points, and the time at which the last data point was added to the outlier. A more detailed description of the values of the statistical data required for abnormality determination is provided herein.

Figure 1:
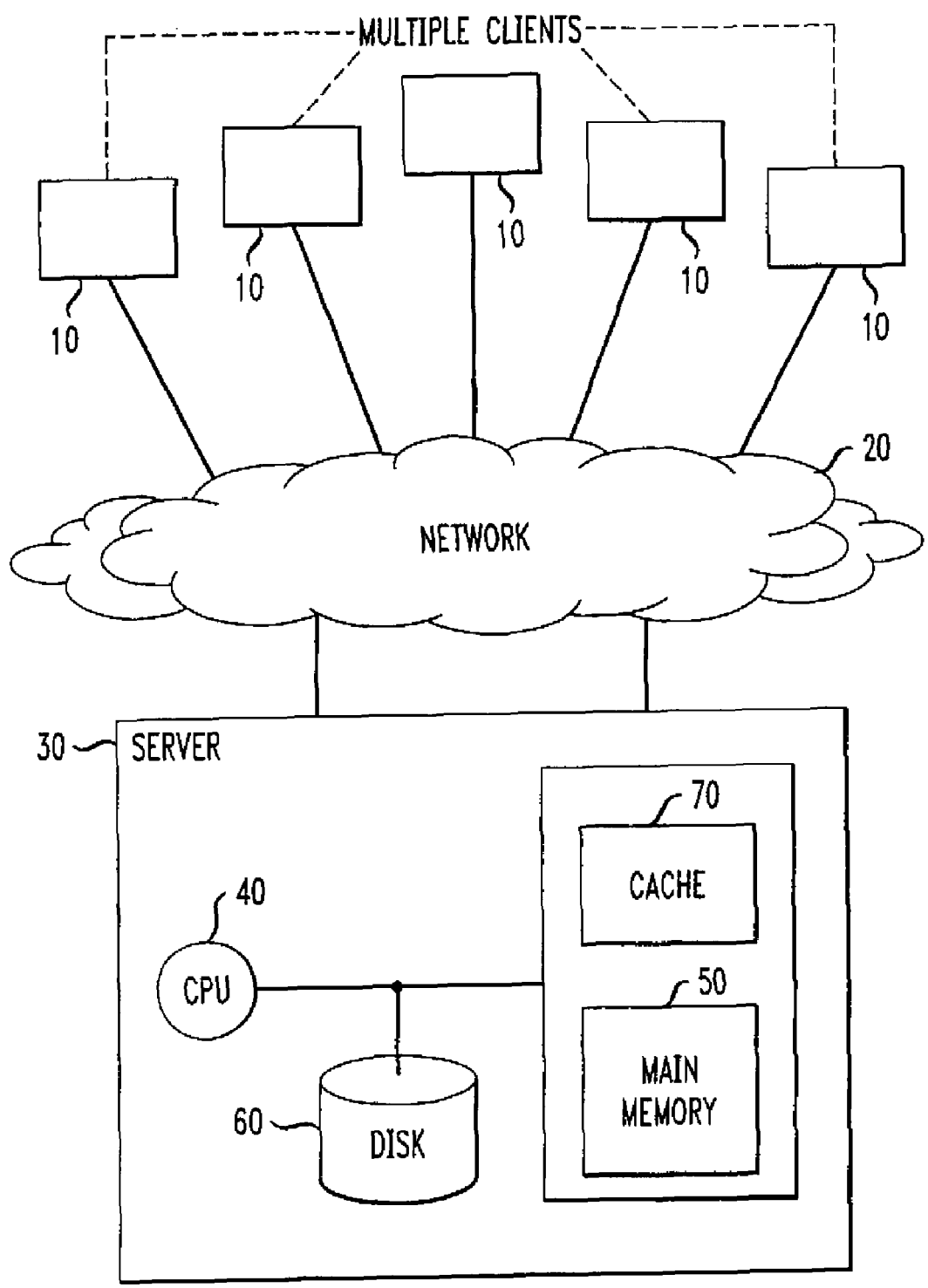
FIG. 1 is a block diagram illustrating a hardware implementation suitable for employing methodologies, according to an embodiment of the present invention.

Referring initially to FIG. 1, a block diagram illustrates a hardware implementation suitable for employing methodologies, according to an embodiment of the present invention. As illustrated, an exemplary system comprises multiple client devices 10 coupled via a large network 20 to a server 30. Server 30 may comprise a central processing unit (CPU) 40 coupled to a main memory 50 and a disk 60. Server 30 may also comprise a cache 70 in order to speed up calculations. Multiple clients 10 can interact with server 30 over large network 20. It is to be appreciated that network 20 may be a public information network such as, for example, the Internet or World Wide Web, however, clients 10 and server 20 may alternatively be connected via a private network, a local area network, or some other suitable network.

Data points from a data stream are received at server 30 from an individual client 10 and stored on disk 60. All computations on the data stream are performed by CPU 40. The clustered data points and their corresponding statistical data are stored on disk 60, and are utilized for the purpose of answering a variety of user queries. For example, a data stream may relate to records of a credit card company corresponding to the transactions of their customers. Attributes of these records may include the age and sex of the customer.

In another example, the data points of the data stream may relate to records corresponding to user accesses, or customer connections, on a network. The queries for abnormalities in the data stream are searches for intrusions, or hacker actions. For example, a customer may attempt to bring down a web server by making millions of web accesses on the server using an automated machine, such as a crawler. The queries or searches for abnormalities may be initiated by a system administrator.

Figure 2:
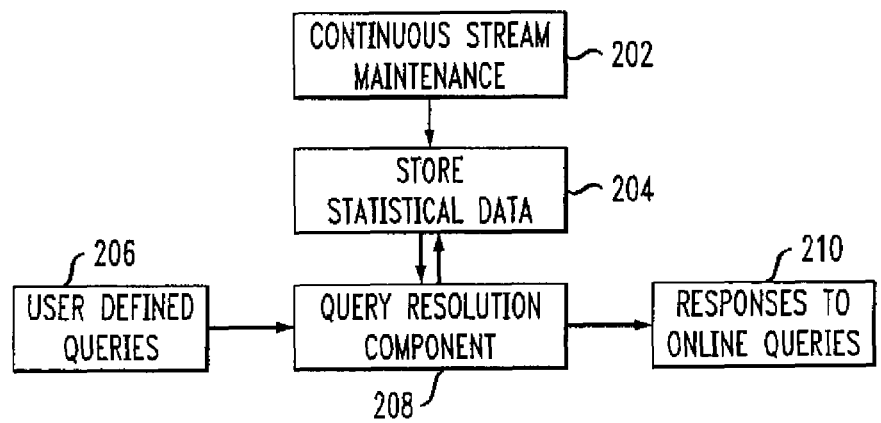
FIG. 2 is a flow diagram illustrating an abnormality monitoring methodology, according to an embodiment of the present invention.

Referring now to FIG. 2, a flow diagram illustrates an abnormality monitoring methodology, according to an embodiment of the present invention. The inventive technique may be divided into two main steps:

(1) storage and maintenance of statistical data from the data stream (blocks 202 and 204); and (2) use of statistical data for online abnormality querying (blocks 206-210).

The methodology begins at block 202, where data stream maintenance is performed. This maintenance involves receiving data points from the data stream and creating clusters, having associated statistical information. A more detailed description of cluster and data stream maintenance is provided in FIG. 3. In block 204, the statistical data of each cluster is stored by server 30. As described above, the stored statistical data may include the number of pairwise attribute values, the number of categorical attribute values, the number of data points, the sum of the weights of the data points, and the time at which the last data point was added. In accordance with this embodiment of the present invention, categorical data streams are pre-processed in such a way that the statistical information about each cluster is pre-stored at regular intervals. These intervals may be chosen based on a pyramidal distribution, as described in, for example, C. C. Aggarwal et al., "A Framework for Clustering Evolving Data Streams," VLDB Conference, 2003, the disclosure of which is incorporated by reference herein. This condensed statistical data should satisfy two requirements:

(1) The statistical data may be easily updated for a fast data stream. The nature of the statistical information is chosen in such a way that it is possible to perform linear updates; and (2) The statistical data allows for the computation of various analytical measures required by the user. Such measures may include clusters or outliers over a specific time horizon. It is also often desirable to determine the nature of a data stream evolution over a given time horizon.

In block 206, a user queries for abnormalities within a specified time horizon (t1, t2). Block 208 receives the query and resolves the query by retrieving stored statistical data of the clusters from block 204. The statistical data is used in order to respond to user queries for abnormalities in block 210, terminating the methodology. A more detailed description of block 210 is provided in FIG. 6.

Figure 3:
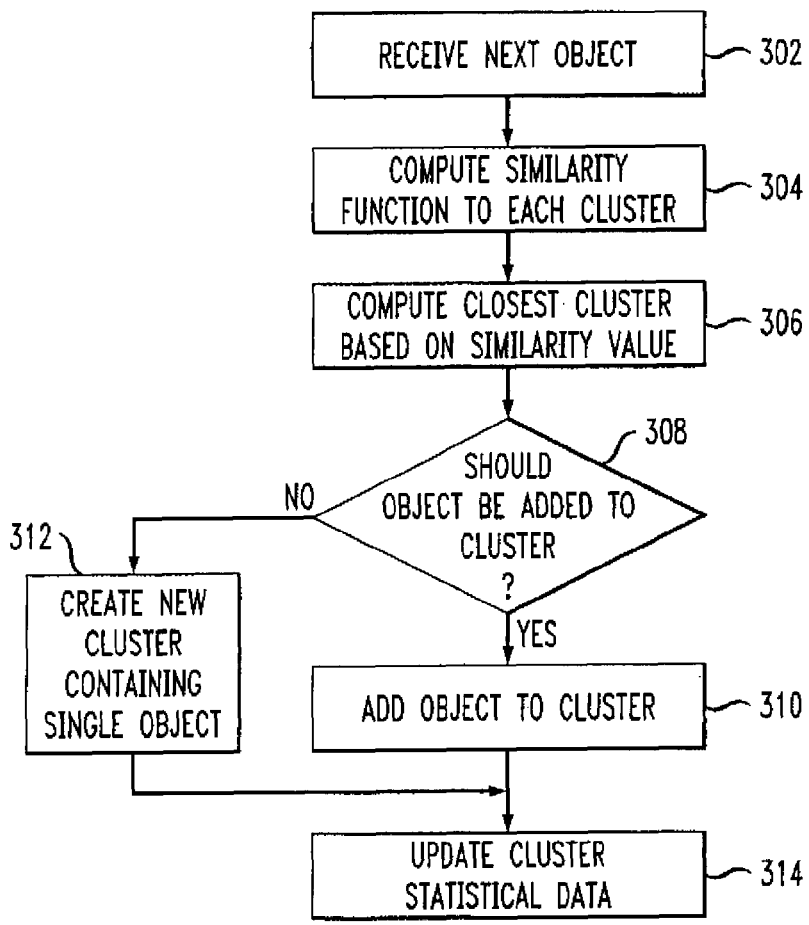
FIG. 3 is a flow diagram illustrating a data stream and cluster maintenance methodology, according to an embodiment of the present invention.

Referring now to FIG. 3, a flow diagram illustrates a data stream and cluster maintenance methodology, according to an embodiment of the present invention. FIG. 3 may be considered a detailed description of block 202 in FIG. 2. The methodology begins at block 302, where a data point is received from the data stream. Similarity values for the data point are then computed, which relate to each existing cluster, in block 304. For example, when a new data point X arrives, its distance to each cluster is computed using a variety of known methods, such as the cosine distance. In block 306, the closest cluster is computed based on a comparison of the computed similarity values. The cluster with the maximum similarity value is chosen as the closest cluster.

In block 308, it is determined whether the data point should be added to the closest cluster. A more detailed description of block 308 is provided in FIG. 4. If it is determined that the data point should be added to the closest cluster, the addition is performed in block 310 and the statistical data of the cluster is updated in block 314, terminating the methodology. A more detailed description of block 314 is provided in FIG. 5. However, if it is determined that the data point should not be added to the cluster, a cluster is created containing the single data point in block 312. The statistical data of this cluster is generated using only this single data point in block 314, terminating the methodology.

A newly created cluster containing only a single data point may be referred to as a "trend-setter." From the point of view of a user, a trend-setter is an outlier, until the arrival of other data points certify the fact that it is actually a cluster. If and when a sufficient number of new data points are added to the cluster, it is referred to as a mature cluster. The specific number of data points needed in order to make a mature cluster is application dependent, however. In the intrusion detection application described above, a mature cluster may contain 20-50 data points.

At a given moment in time, a mature cluster can either be "active" or "inactive." A mature cluster is said to be active when it has received data points in the recent past. When a mature cluster has not received data points in the recent past, it is said to be inactive. Again, the specific amount of time that must pass in order for a mature cluster to become inactive is application dependent. However, in the intrusion detection application, an active mature cluster may be a mature cluster that has received data points in the last ten days. In some cases, a trend-setter cluster becomes inactive before it has a chance to mature. Such a cluster typically contains a small number of transient data points, which may typically be the result of an underlying abnormality that is short-term in nature.

A set of clusters may be dynamically maintained by effectively scaling with data size. In order to achieve better scalability during data stream maintenance, data structures may be constructed that allow for additive operations on the data points.

In order to achieve greater accuracy in the clustering technique, a high level of granularity is maintained in the maintenance of the underlying data structures. This may be achieved through a condensation technique in which groups of data clusters are condensed. These groups of clusters are referred to as cluster droplets.

A cluster droplet $D(t, C)$ at time t, and a set of categorical data points C is referred to as a tuple (DF2, DF1, n, w(t), l), in which each statistical component is defined as follows:

vector DF2 contains the number of the pairwise attribute values;

vector DF1 contains the number of the categorical attribute values;

entry n contains the number of data points in the cluster;

entry w(t) contains the sum of the weights of the data points at time t (the value w(t) is a function of the time t and decays with time unless new data points are added to the droplet $D(t, C)$); and entry l contains the time stamp of the last time that a data point was added to the cluster.

Cluster droplet maintenance involves storing the data at a high level of granularity so as to lose the least amount of information. The droplet update technique continuously maintains a set of cluster droplets $D(t, C_1) \ldots D(t, C_k)$, which it updates as new data points arrive. For each cluster, the entire set of statistical data is maintained in the droplet. The maximum number of droplets k which are maintained is dependent upon the amount of available main memory 50. In receiving data points, it is first assumed that no clusters exist. As new data points arrive, unit clusters containing individual data points are created. Once a maximum number k of such clusters have been created, the online maintenance of the clusters may begin starting with a trivial set of k clusters which are updated over time with the arrival of new data points.

Figure 4:
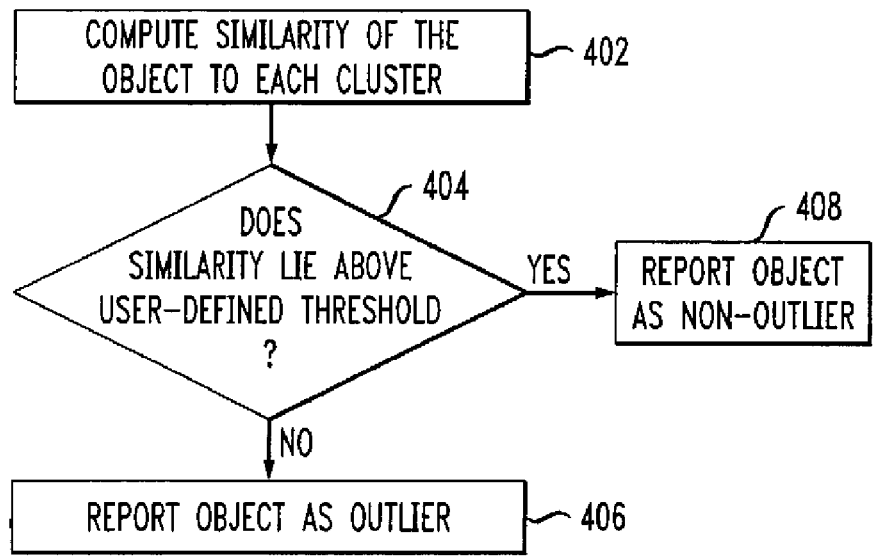
FIG. 4 is a flow diagram illustrating a data point addition methodology, according to an embodiment of the present invention.

Referring now to FIG. 4, a flow diagram illustrates a data point addition methodology, according to an embodiment of the present invention. This may be considered a detailed description of block 308 of FIG. 3. The methodology begins at block 402, where similarity values of a given data point are computed relative to each cluster centroid. In block 404, it is determined whether the similarity value relating to the closest cluster is larger than a user-defined threshold. The user-defined threshold is chosen based on application dependent considerations regarding level of similarity desired in order for a data point to be considered a natural part of a given cluster. If the similarity value is greater than the user-defined threshold, the data point is reported as a non-outlier in block 408, and may added to the closest cluster, terminating the methodology. If the similarity value is less than or equal to the user-defined threshold, the data point is reported as an outlier in block 406, terminating the methodology.

In the case of cluster droplets described above, which maintain a maximum number of droplets k, the cluster with the maximum similarity value is defined as $C_{mindex}$. If a similarity value of $S(X, C_{mindex})$ is greater than the user-defined threshold, the point X is assigned to the cluster $C_{mindex}$. It is also determined whether an inactive cluster exists in the existing set of cluster droplets. If no such inactive cluster exists, then the data point X is added to $C_{mindex}$. In the even that the data point X is assigned to the cluster $C_{mindex}$, two steps are performed:

the statistics are updated to reflect the decay of the data points at the current moment in time; and the statistics for each newly arriving data point are added to the statistics of $C_{mindex}$.

In the event that the newly arriving data point does not naturally fit in any of the cluster droplets and an inactive cluster does exist, then the most inactive cluster is replaced by a new cluster containing the solitary data point X. The most inactive cluster may be defined as the least recently updated cluster droplet. This new cluster is a potential outlier, or the beginning of a new trend. Further understanding of this new cluster droplet may only be obtained with the progress of the data stream.

Figure 5:
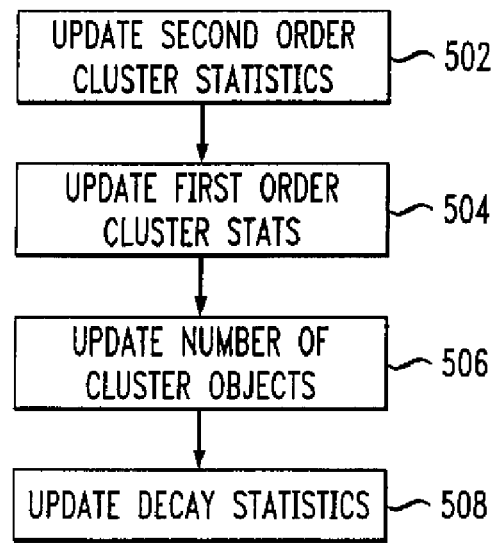
FIG. 5 is a flow diagram illustrating a statistical data update methodology, according to an embodiment of the present invention.

Referring now to FIG. 5, a flow diagram illustrates a cluster statistical data update methodology, according to an embodiment of the present invention. This may be considered a detailed description of block 314 in FIG. 3.

The methodology begins at block 502, where the number of attributes corresponding to pairwise values DF2, or second order statistics, is updated. In block 504, the number of attributes corresponding to individual categories DF1, or first order statistics, is updated. In block 506, the number of data points are updated, and in block 508 the decay statistics are updated, terminating the methodology. Decay statistics relate to weights of the data points and the time at which the last data point was added to the cluster.

In order to more fully describe decay statistics, a further description of the data stream is first required. The data stream comprises a set of multi-dimensional records $X_1 \ldots X_k \ldots$ arriving at time stamps $T_1 \ldots T_k \ldots$. Each $X_i$ is a multi-dimensional categorical record containing d dimensions which are denoted by $X_i=(x^1_i \ldots x^d_i)$. It is assumed that the ith categorical dimension contains $v_i$ possible values. Since the stream clustering technique should attribute greater importance to recent clusters, a time-sensitive weight is provided for each data point. It is assumed that each data point has a weight defined by f(t), which is also referred to as the fading function. The fading function f(t) is a non-monotonic decreasing function which decays uniformly with time t. In order to formalize this concept, the half-life of a point in the data stream is defined as the time at which $f(t_0)=(\frac{1}{2}) f(0)$.

Conceptually, the aim of defining a half life is to define the rate of decay of the weight assigned to each data point in the stream. Correspondingly, the decay-rate is defined as the inverse of the half life of the data stream. The decay-rate is denoted by $\lambda=1/t_0$. In order for the half-life property to hold, the weight of each point in the data stream is defined by $f(t)=2^{-\lambda t}$, creating a half life of $1/\lambda$. In the intrusion detection application described above, a decay rate may be 0.5 per day, thus, having a half-life of two days. However, the decay rate and half-life are application dependent, and therefore may differ from these examples.

By changing the value of $\lambda$, it is possible to change the rate at which the importance of the historical information in the data stream decays. The higher the value of $\lambda$, the lower the importance of the historical information compared to more recent data. By changing the value of this parameter, it is possible to obtain considerable control on the rate at which the historical statistics are allowed to decay. For more stable data streams, it is desirable to pick a smaller value of $\lambda$, whereas for rapidly evolving data streams, it is desirable to pick a larger value of $\lambda$.

Figure 6:
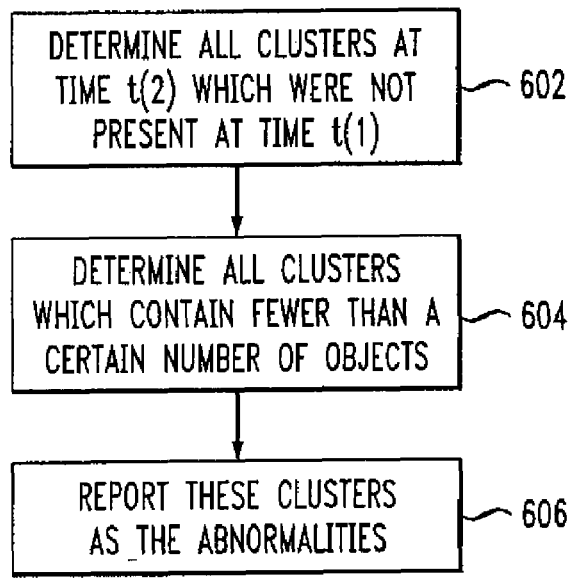
FIG. 6 is a flow diagram illustrating an abnormality discovery methodology, according to an embodiment of the present invention.

Referring now to FIG. 6, a flow diagram illustrates an abnormality discovery methodology, according to an embodiment of the present invention. This may be considered a detailed description of block 210 of FIG. 2. These abnormalities are discovered in the time horizon (t1, t2). The methodology begins at block 602, where it is determined which clusters present at time t(2), were not present at time t(1). In block 604, it is determined which of the clusters satisfying the previous requirement, contain fewer than a defined number of points at time t(2). The clusters having fewer than the defined number of points are reported as the abnormal outliers in block 606, and the methodology terminates.

For example, when a new cluster is created during the streaming technique by a newly arriving data point, it is allowed to remain as a trend-setting outlier for at least one half-life. During that period, if at least one more data point is added to the newly formed cluster, it becomes an active and mature cluster. If no new points arrive during a half-life, then the trend-setting outlier is recognized as a true abnormality in the data stream, and the single point cluster is removed from the current set of clusters. Thus, a new cluster containing one data point is removed when the (weighted) number of points in the cluster is 0.5.

This criterion is also used for the removal of mature clusters. In other words, a mature cluster is removed when the weighted number of points in that cluster is larger than 0.5. This will happen only when the inactivity period in the cluster has exceeded the half life $1/\lambda$. The greater the number of points in the cluster, the greater the level by which the inactivity period would need to exceed its half life in order to be considered an inactive cluster. This is a natural solution, since it is intuitively desirable to have stronger requirements (a longer inactivity period) for the elimination of a cluster containing a larger number of points.

Figure 7:
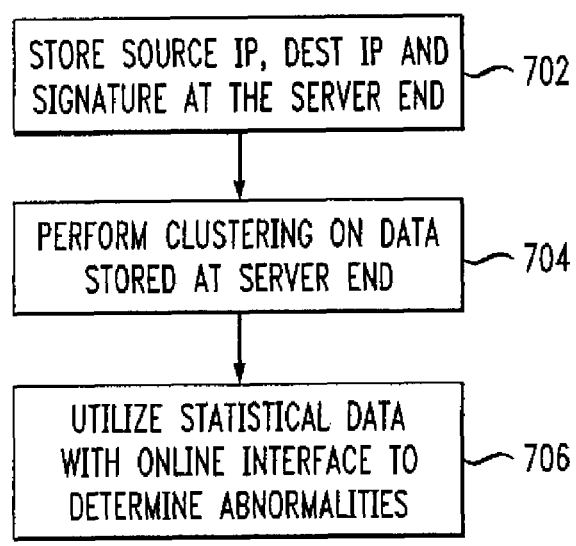
FIG. 7 is a flow diagram illustrating a network intrusion detection methodology, according to an embodiment of the present invention.

The inventive techniques are applicable to a large number of applications such as systems diagnosis. For example, as described above, the techniques of the present invention may be utilized for online monitoring of network intrusions. Referring now to FIG. 7, a flow diagram illustrates a network intrusion detection methodology, according to an embodiment of the present invention. The goal of the methodology is to find intrusion attacks. The methodology begins by storing a stream of source IP (Internet Protocol) address data, destination IP address data, and signature data at the server, in block 702. Signature data refers to a field in the network logs defining the type of network access. The clustering technique of the invention is utilized in order to create summary or statistical data in block 704. Different weights can be utilized to make the clustering technique more effective. In block 706, this statistical data is used to discover abnormalities or customer actions considered intrusions, terminating the methodology. If desired, an online interface can also be utilized in order to diagnose the abnormalities.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

The invention claimed is:

1. A method for monitoring abnormalities in a data stream, comprising the steps of:
   receiving a plurality of objects in the data stream;
   creating one or more clusters from the plurality of objects, each of the one or more clusters comprising one or more objects of the plurality of objects, wherein at least a subset of the one or more clusters are condensed into one or more cluster droplets, a given cluster droplet storing statistical data of each cluster within the given cluster droplet;
   determining from the statistical data whether each of the one or more clusters is abnormal when compared to a predefined value; and
   reporting at least one of the one or more clusters as an abnormal cluster of objects in the data stream;
   wherein the statistical data of each cluster within the given cluster droplet comprises:
      a number of pairwise attribute values;
      a number of categorical attribute values;
      a number of objects in the cluster;
      a total weight of the one or more objects in the cluster, wherein a weight of each of the one or more objects in the cluster is based at least in part on a fading function such that the weight of a given object substantially uniformly decreases over time; and
      a value indicative of when an object was most recently added to the cluster; and
   wherein the step of creating one or more clusters further comprises:
      computing one or more similarity values for a given object relating to one or more existing clusters;

determining a closest cluster for the object based on the one or more similarity values;

determining whether the similarity value for the object relating to the closest cluster is greater than a threshold;

responsive to a determination that the similarity value is greater than the threshold, adding the object to the closest cluster and updating the statistical data of the closest cluster;

responsive to a determination that the similarity value is not greater than the threshold, determining whether there is at least one inactive cluster;

responsive to a determination that there is no inactive cluster, adding the object to the closest cluster and updating the statistical data of the closest cluster; and responsive to a determination that there is at least one inactive cluster, replacing one of the at least one inactive cluster with a new cluster comprising the object and generating statistical data of the new cluster.

2. The method of claim 1, wherein the step of determining from the statistical data whether each of the one or more clusters is abnormal comprises the steps of:

determining which clusters present at a first time were not present at a second time, wherein the second time is before the first time;

determining which of the clusters, present at the first time and not present at the second time, contain fewer than a user-defined number of objects; and reporting clusters with fewer than the user-defined number of objects as abnormalities.

3. The method of claim 1, wherein the statistical data of each cluster is stored using an incremental updating process.

4. The method of claim 1, wherein the statistical data of each cluster comprises one or more statistical counts of each pairwise attribute.

5. The method of claim 1, wherein the statistical data of each cluster comprises one or more statistical counts of each categorical attribute.

6. The method of claim 1, wherein the statistical data is stored periodically at intervals chosen based on a pyramidal distribution.

7. The method of claim 1, wherein the step of creating one or more clusters further comprises the step of applying one or more weights to one or more attributes.

8. The method of claim 1, wherein abnormalities comprise intrusions in a network.

9. The method of claim 8, wherein the step of receiving a plurality of objects further comprises the step of collecting source IP (Internet Protocol) address data, destination IP address data and signature data.

10. The method of claim 8, wherein the step of creating one or more clusters further comprises the step of clustering source IP address data, destination IP address data and signature data.

11. The method of claim 8, wherein the step of determining from the statistical data whether each of the one or more clusters is abnormal comprises the step of detecting one or more intrusions from statistical data of source IP address data, destination IP address data and signature data.

12. The method of claim 1, wherein a given cluster is an inactive cluster when a total weight of the one or more objects in the given cluster is less than a threshold value, wherein the total weight is based at least in part on a number of objects in the given cluster and on an amount of time since each of the one or more objects was added to the given cluster.

13. An apparatus for monitoring abnormalities in a data stream, comprising:

a memory; and at least one processor coupled to the memory and operative to: (i) receive a plurality of objects in the data stream; (ii) create one or more clusters from the plurality of objects, each of the one or more clusters comprising one or more objects of the plurality of objects, wherein at least a subset of the one or more clusters are condensed into one or more cluster droplets, a given cluster droplet storing statistical data of each cluster within the given cluster droplet; and (iii) determine from the statistical data whether each of the one or more clusters is abnormal when compared to a predefined value;

wherein the statistical data of each cluster within the given cluster droplet comprises:

a number of pairwise attribute values;

a number of categorical attribute values;

a number of objects in the cluster;

a total weight of the one or more objects in the cluster, wherein a weight of each of the one or more objects in the cluster is based at least in part on a fading function such that the weight of a given object substantially uniformly decreases over time; and a value indicative of when an object was most recently added to the cluster; and wherein the operation of creating one or more clusters further comprises:

computing one or more similarity values for a given object relating to one or more existing clusters;

determining a closest cluster for the object based on the one or more similarity values;

determining whether the similarity value for the object relating to the closest cluster is greater than a threshold;

responsive to a determination that the similarity value is greater than the threshold, adding the object to the closest cluster and updating the statistical data of the closest cluster;

responsive to a determination that the similarity value is not greater than the threshold, determining whether there is at least one inactive cluster;

responsive to a determination that there is no inactive cluster, adding the object to the closest cluster and updating the statistical data of the closest cluster; and responsive to a determination that there is at least one inactive cluster, replacing one of the at least one inactive cluster with a new cluster comprising the object and generating statistical data of the new cluster.

14. The apparatus of claim 13, wherein the operation of determining from the statistical data whether each of the one or more clusters is abnormal further comprises:

determining which clusters present at a first time were not present at a second time, wherein the second time is before the first time;

determining which of the clusters, present at the first time and not present at the second time, contain fewer than a user defined number of objects; and reporting clusters with fewer than a defined number of objects as abnormalities.

15. The apparatus of claim 13, wherein the statistical data of each cluster is stored using an incremental updating process.

16. The apparatus of claim 13, wherein the statistical data of each cluster comprises one or more statistical counts of each pairwise attribute.

17. The apparatus of claim 13, wherein the statistical data of each cluster comprises one or more statistical counts of each categorical attribute.

18. The apparatus of claim 13, wherein the statistical data is stored periodically at intervals chosen based on a pyramidal distribution.

19. The apparatus of claim 13, wherein the operation of creating one or more clusters further comprises applying one or more weights to one or more attributes.

20. The apparatus of claim 13, wherein abnormalities comprise intrusions in a network.

21. The apparatus of claim 20, wherein the operation of receiving a plurality of objects further comprises collecting source IP address data, destination IP address data and signature data.

22. The apparatus of claim 20, wherein the operation of creating one or more clusters further comprises clustering source IP address data, destination IP address data and signature data.

23. The apparatus of claim 20, wherein the operation of determining from the statistical data whether each of the one or more clusters is abnormal further comprises detecting one or more intrusions from statistical data of source IP address data, destination IP address data, and signature data.

24. The apparatus of claim 13, wherein a given cluster is an inactive cluster when a total weight of the one or more objects in the given cluster is less than a threshold value, wherein the total weight is based at least in part on a number of objects in the given cluster and on an amount of time since each of the one or more objects was added to the given cluster.

25. An article of manufacture for monitoring abnormalities in a data stream, comprising a machine readable medium containing one or more programs which when executed implement the steps of:
   receiving a plurality of objects in the data stream;
   creating one or more clusters from the plurality of objects, each of the one or more clusters comprising one or more objects of the plurality of objects, wherein at least a subset of the one or more clusters are condensed into one or more cluster droplets, a given cluster droplet storing statistical data of each cluster within the given cluster droplet;
   determining from the statistical data whether each of the one or more clusters is abnormal when compared to a predefined value; and
   reporting at least one of the one or more clusters as an abnormal cluster of objects in the data stream;
   wherein the statistical data of each cluster within the given cluster droplet comprises:
      a number of pairwise attribute values;
      a number of categorical attribute values;
      a number of objects in the cluster;
      a total weight of the one or more objects in the cluster, wherein a weight of each of the one or more objects in the cluster is based at least in part on a fading function such that the weight of a given object substantially uniformly decreases over time; and
      a value indicative of when an object was most recently added to the cluster; and
   wherein the step of creating one or more clusters further comprises:
      computing one or more similarity values for a given object relating to one or more existing clusters;
      determining a closest cluster for the object based on the one or more similarity values;
      determining whether the similarity value for the object relating to the closest cluster is greater than a threshold;
      responsive to a determination that the similarity value is greater than the threshold, adding the object to the closest cluster and updating the statistical data of the closest cluster;
      responsive to a determination that the similarity value is not greater than the threshold, determining whether there is at least one inactive cluster;
      responsive to a determination that there is no inactive cluster, adding the object to the closest cluster and updating the statistical data of the closest cluster; and
      responsive to a determination that there is at least one inactive cluster, replacing one of the at least one inactive cluster with a new cluster comprising the object and generating statistical data of the new cluster.

26. The article of manufacture of claim 25, wherein a given cluster is an inactive cluster when a total weight of the one or more objects in the given cluster is less than a threshold value, wherein the total weight is based at least in part on a number of objects in the given cluster and on an amount of time since each of the one or more objects was added to the given cluster.

* * * * *